No. 882,475. PATENTED MAR. 17, 1908.
M. MARTIN.
COAL AUGER.
APPLICATION FILED JUNE 19, 1907.
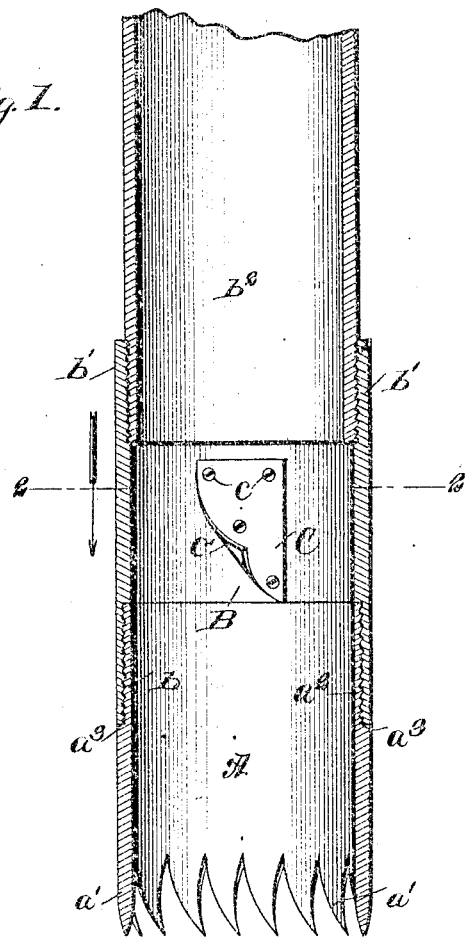
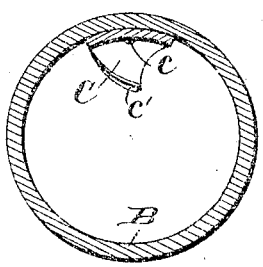
WITNESSES
E. M. Callaghan
C. E. Trainor
INVENTOR
MATTHEW MARTIN
BY Munn & Co.
ATTORNEYS

UNITED STATES PATENT OFFICE.

MATTHEW MARTIN, OF GILMORE, MARYLAND.

COAL-AUGER.

No. 882,475.

Specification of Letters Patent.

Patented March 17, 1908.

Application filed June 19, 1907. Serial No. 379,696.

*To all whom it may concern:*

Be it known that I, MATTHEW MARTIN, a citizen of the United States, and resident of Gilmore, in the county of Allegany and State of Maryland, have invented an Improvement in Coal-Augers, of which the following is a specification.

My invention is an improvement in coal augers, and consists in certain novel constructions and combinations of parts hereinafter described and claimed.

Referring to the drawings forming a part hereof, Figure 1 is a central longitudinal section through my improvement. Fig. 2 is a section on the line 2—2 of Fig. 1.

In the present embodiment of my invention, the bit A comprises a ring $a$ having upon one edge thereof a plurality of teeth $a'$ of the shape shown in Fig. 1. The ring $a$ is externally screw threaded as at $a^2$ at the opposite edge from the teeth, and a shoulder $a^3$ is arranged between the screw threaded portion and the body portion of the ring. A tubular holder B is internally screw threaded at each end, as at $b$, $b'$ one of said ends engaging the threads of the ring and the other end being engaged by a section of pipe $b^2$, the said pipe being supported in any suitable manner and connected with any suitable driving mechanism for rotating the bit.

It will be noticed from inspection of Fig. 1 that the front edges of the teeth are concave, and that the rear edges are convex, and the teeth may be set or staggered with respect to each other, the depth of the set depending upon the hardness of the material to be operated upon.

In the operation of the device, since the bit is hollow, a core of coal is produced within the ring as the bit advances, and to break up this core, a plate C is provided, the said plate being attached to the inner surface of the holder B by means of the screws $c$, and one of the outer corners of the plate is turned at approximately a right angle to the plate, as at $c'$, and the edges of the said corner are sharpened to form cutting edges. The cutting edge of the plate acts upon the core, breaking said core into small pieces, and assisting to feed it outwardly through the hollow pipe.

I claim:

1. A coal auger comprising a ring having one of its edges provided with a plurality of teeth, the other edge of the ring being externally screw threaded, and provided with a shoulder between the screw threaded portion and the ring, a tubular holder for the ring, said holder being internally screw threaded at one end, said ring being threaded into the threaded end of the holder, means engaging the opposite end of the holder for rotating the cutter, and means within the holder for breaking the core formed by the bit, said means comprising a plate detachably connected with the inner surface of the holder, one of the corners of said plate being turned outwardly at an angle to the plate and having its edges formed into cutting edges for the purpose set forth.

2. A coal auger comprising a ring having one of its edges provided with a plurality of teeth, the other edge of the ring being externally screw threaded and provided with a shoulder between the screw threaded portion and the ring, a tubular holder for the ring, said holder engaging the threaded end of said ring, means engaging the opposite end of the holder for rotating the cutter, and means within the holder for breaking the core formed by the bit, said means comprising a plate detachably connected with the inner surface of the holder, one of the corners of said plate being turned outwardly at an angle to the plate and having its edges formed into cutting edges for the purpose set forth.

3. A coal auger comprising a ring having one of its edges provided with a plurality of teeth, a tubular holder detachably connected with the other edge of the ring, means engaging the holder for rotating the cutter, and means within the holder for breaking the core formed by the bit, said means comprising a plate detachably connected with the inner surface of the holder, one of the corners of said plate being turned outwardly at an angle to the plate and having its edges formed into cutting edges for the purpose set forth.

4. A coal auger, comprising a ring having one of its edges provided with a plurality of teeth, a tubular holder for the ring, means connected with the holder for rotating the cutter, and means within the holder for breaking the core formed by the bit, said means comprising a plate connected with the inner surface of the holder, one of the corners of said plate being turned outwardly at an angle to the plate.

MATTHEW MARTIN.

Witnesses:
  WILLIAM H. MARTIN,
  JOHN J. MARTIN.